United States Patent [19]

Reeves

[11] Patent Number: 5,798,482
[45] Date of Patent: Aug. 25, 1998

[54] LIGHTNING PROTECTION DEVICE

[76] Inventor: Michael John Reeves, 14 Gun Wharf, 124 Wapping High St, London, England, E19NH

[21] Appl. No.: 787,954

[22] Filed: Jan. 23, 1997

[51] Int. Cl.$^6$ ........................................ H01B 17/58
[52] U.S. Cl. ........................ 174/2; 174/5 R; 361/117
[58] Field of Search ........................ 174/5 R, 2, 3, 174/4, 4 R, 6, 7; 361/117, 131, 118, 1; 280/DIG. 5, DIG. 6

[56] References Cited

U.S. PATENT DOCUMENTS

| | | | |
|---|---|---|---|
| 286,086 | 10/1883 | Spang | 174/2 |
| 437,526 | 9/1890 | Spang | 174/2 |
| 1,189,565 | 7/1916 | Hartsaw | 174/2 |
| 1,743,526 | 12/1930 | Cage | 174/2 |
| 4,447,847 | 5/1984 | Druland | 361/117 |
| 5,235,997 | 8/1993 | Good | 135/25.3 |

*Primary Examiner*—Kristine L. Kincaid
*Assistant Examiner*—Dhiru R. Patel

[57] ABSTRACT

A new Lightning Protection Device for providing protection to individuals against lightning strikes. The inventive device includes a plurality of electrically conducting bands being spaced apart and extending outwardly and downwardly either from a center post over the canopy support frame of a golf cart or from a plurality of spaced apart ribs radiating outwardly from the ferrule of an umbrella. The electrically conducting bands extend downwardly in an elongated configuration to terminate at or near ground level. The electrically conducting bands together with the center post or the ferrule form an electrically conducting cage or envelope to surround the user within an electrically protected volume of space in the event of a lightning strike.

15 Claims, 2 Drawing Sheets

LIGHTNING PROTECTION DEVICE

BACKGROUND OF THE INVENTION

1. Field of the Invention

The present invention relates to lightning protection devices and more particularly pertains to a new Lightning Protection Device for providing protection to individuals against lightning strikes.

2. Description of the Prior Art

The use of lightning protection devices is known in the prior art. More specifically, lightning protection devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art lightning protection devices include U.S. Pat. No. 3,894,608 to Laenle; U.S. Pat. No. 5,043,527 to Carpenter, Jr.; U.S. Pat. No. Des. 326,422 to Heary; U.S. Pat. No. 5,365,398 to Briet; U.S. Pat. No. 5,052,604 to Tourangeau and U.S. Pat. No. 5,036,785 to Kittredge, Jr. and Wagner.

While these devices fulfill their respective, particular objectives and requirements, the aforementioned patents do not disclose a new Lightning Protection Device. The inventive device includes a plurality of electrically conducting bands being spaced apart and extending outwardly and downwardly either from a center post over the canopy support frame of a golf cart or from a plurality of spaced apart ribs radiating outwardly from the ferrule of an umbrella. The electrically conducting bands extend downwardly in an elongated configuration to terminate at or near ground level. The electrically conducting bands together with the center post or the ferrule form an electrically conducting cage or envelope to surround the user within an electrically protected volume of space in the event of a lightning strike.

In these respects, the Lightning Protection Device according to the present invention substantially departs from the conventional concepts and designs of the prior art, and in so doing provides an apparatus primarily developed for the purpose of providing protection to individuals against lightning strikes.

SUMMARY OF THE INVENTION

The present invention sets out to provide equipment which diminishes the risk from lightning strikes.

Every year there are a number of fatalities on golf courses due to lightning strikes, since golf is typically played in generally open spaces and under weather conditions such that thunderstorms can from time to time be encountered. Also, the golfer can be some distance from effective shelter and is still in danger if he shelters from rain under a tree or uses a golf umbrella.

Often, the golfer uses a motorized cart or buggy to transport himself and his clubs about the course. This can provide shelter from rain, but once again as an isolated upstanding unit, it can be a focus for a lightning strike. This is especially true if the golf cart is at all warm, to create a rising stream of relatively warmer air. The perceived risk of lightning strikes is not only unpleasant for golfers, but also for golf course owners and operators.

In view of the foregoing disadvantages inherent in the known types of lightning protection devices now present in the prior art, the present invention provides a new Lightning Protection Device construction wherein the same can be utilized for providing protection to individuals against lightning strikes.

The general purpose of the present invention, which will be described subsequently in greater detail, is to provide a new Lightning Protection Device apparatus and method which has many of the advantages of the lightning protection devices mentioned heretofore and many novel features that result in a new Lightning Protection Device which is not anticipated, rendered obvious, suggested, or even implied by any of the prior art lightning protection devices, either alone or in any combination thereof.

To attain this, the present invention generally comprises a plurality of electrically conducting bands being spaced apart and extending outwardly and downwardly either from a center post over the canopy support frame of a golf cart or from a plurality of spaced apart ribs radiating outwardly from the ferrule of an umbrella. The electrically conducting bands extend downwardly in an elongated configuration to terminate at or near ground level. The electrically conducting bands together with the center post or the ferrule form an electrically conducting cage or envelope to surround the user within an electrically protected volume of space in the event of a lightning strike.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Lightning Protection Device apparatus and method which has many of the advantages of the lightning protection devices mentioned heretofore and many novel features that result in a new Lightning Protection Device which is not anticipated, rendered obvious, suggested, or even implied by any of the prior art lightning protection devices, either alone or in any combination thereof.

It is another object of the present invention to provide a new Lightning Protection Device which may be easily and efficiently manufactured and marketed.

It is a further object of the present invention to provide a new Lightning Protection Device which is of a durable and reliable construction.

An even further object of the present invention is to provide a new Lightning Protection Device which is susceptible of a low cost of manufacture with regard to both materials and labor, and which accordingly is then susceptible of low prices of sale to the consuming public, thereby making such Lightning Protection Device economically available to the buying public.

Still yet another object of the present invention is to provide a new Lightning Protection Device which provides in the apparatuses and methods of the prior art some of the advantages thereof, while simultaneously overcoming some of the disadvantages normally associated therewith.

Still another object of the present invention is to provide a new Lightning Protection Device for providing protection to individuals against lightning strikes.

Yet another object of the present invention is to provide a new Lightning Protection Device which includes a plurality of electrically conducting bands being spaced apart and extending outwardly and downwardly either from a center post over the canopy support frame of a golf cart or from a plurality of spaced apart ribs radiating outwardly from the ferrule of an umbrella. The electrically conducting bands extend downwardly in an elongated configuration to terminate at or near ground level. The electrically conducting bands together with the center post or the ferrule form an electrically conducting cage or envelope to surround the user within an electrically protected volume of space in the event of a lightning strike.

Still yet another object of the present invention is to provide a new Lightning Protection Device that protects golfers using golf carts from lightning strikes on golf courses.

Even still another object of the present invention is to provide a new Lightning Protection Device that provides shelter from rain while protecting against lightning strikes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
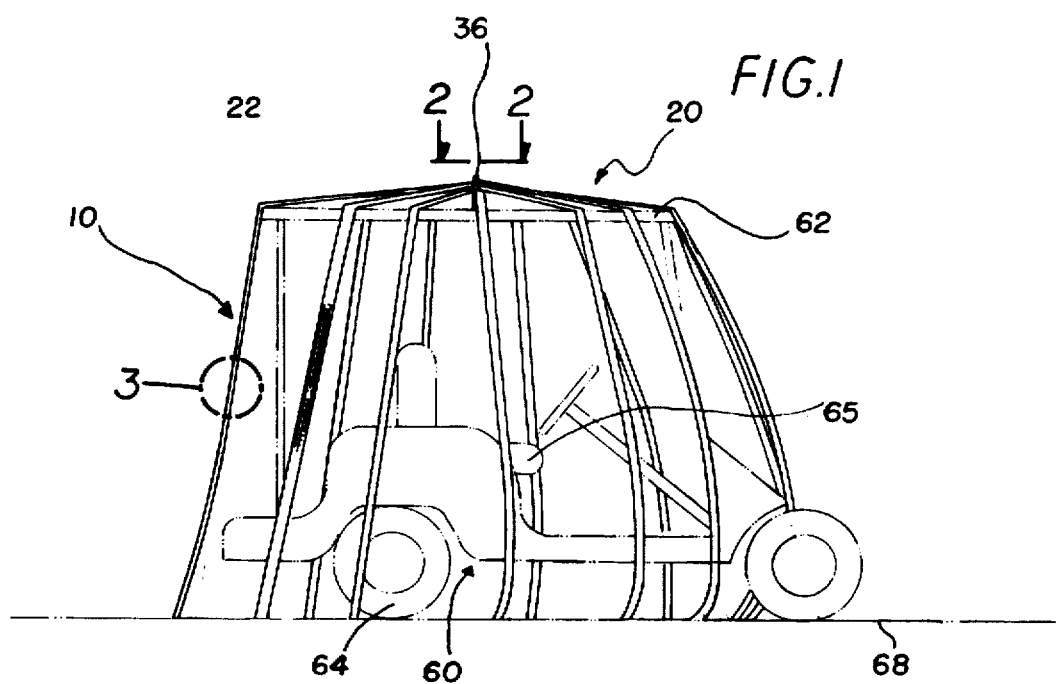
FIG. 1 is a side view of a new Lightning Protection Device on a golf cart according to the present invention.

With reference now to the drawings, and in particular to FIGS. 1 through 5 thereof, a new Lightning Protection Device embodying the principles and concepts of the present invention and generally designated by the reference numeral 10 will be described.

More specifically, it will be noted that the Lightning Protection Device 10 comprises an electrically conducting cage 20 formed by a plurality of electrically conducting bands 22 extending outwardly and downwardly from an upwardly extending center post 36 which is attached to the canopy support means 62 of a golf cart 60.

Figure 4:
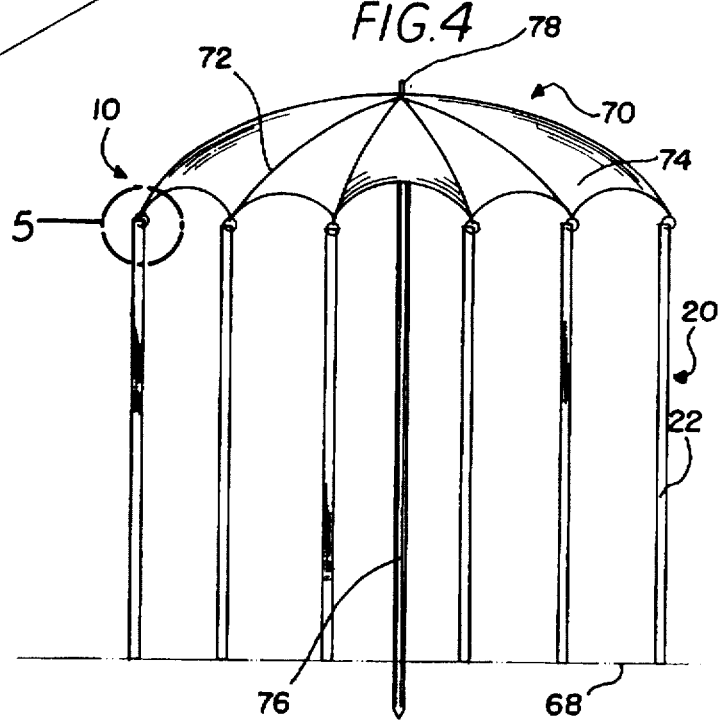
FIG. 4 is a side view of the umbrella embodiment of the invention.

As best illustrated in FIGS. 1 through 5, it can be shown that there are two basic embodiments of the lightning protection device 10 on either a golf cart 60 as shown by FIG. 1 or an umbrella as shown by FIG. 4.

In the first embodiment, as shown by FIG. 1, the lightning protection device 10 is designed for use on a golf cart 60. The golf cart 60 is of conventional design having tires 64 and a passenger or seating area 65. The golf cart also includes a canopy support frame 62 extending over the passenger area 65. The canopy support frame 62 acts as a support means for the lightning protection device 10 over the golf cart 60. Typically, such carts have a canopy (not pictured) attached to the canopy support frame 62 to give protection from the sun and wet weather. The canopy may also include roll-down blinds (not pictured) that hang down from the canopy support frame 62 from the end and/or sides, to give further protection in wet weather. The motive power, operation and steering of such a golf cart 60 can be conventional and forms no part of the present invention.

As shown in FIG. 1, a center post 36 is attached to the canopy support frame 62. A plurality of electrically conductive bands 22 extend outwardly and downwardly from the center post 36 to terminate either touching the ground 68 or close to the ground 68. The electrically conducting bands 22 are attached to the center post 36 either directly or by a mounting bracket 30. The mounting bracket 30 is preferable to direct attachment to the center post 36 because it allows quick removal of the lightning protection device 10 from the golf cart 60.

Figure 2:
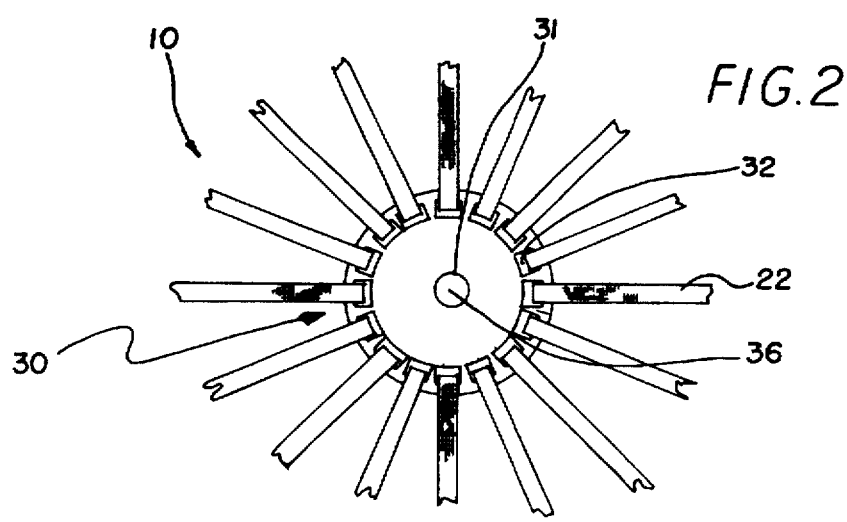
FIG. 2 is a top plan view of the mounting bracket as seen from line 2—2 of FIG. 1
Figure 3:
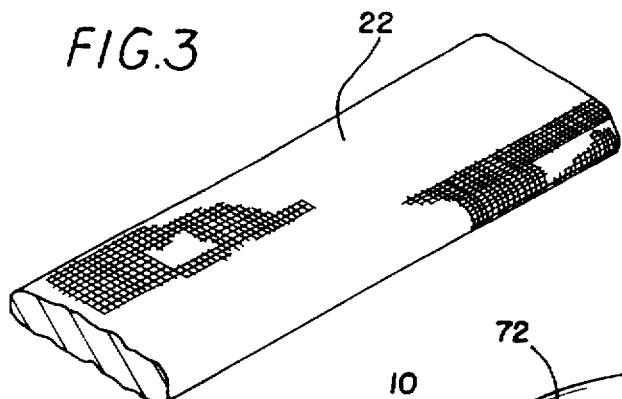
FIG. 3 is a break away perspective view of an electrical conducting band taken from the area enclosed by circle 3 of FIG. 1.

FIG. 2 shows the electrically conducting bands 22 attached to the center post 36 by the mounting bracket 30. The mounting bracket 30 is attached to the center post 36 by inserting the center post 36 into the center post mounting hole 31 which is located at the center of the mounting bracket 30. The mounting bracket 30 also has a plurality of band attachment slots 32 around its outer periphery. The electrically conducting bands 22 are attached to the mounting bracket 30 by inserting one end of each electrically conducting band 22 into a separate band attachment slot 32.

The exact nature of the electrically conducting bands 22 can vary as long as they are electrically continuous and are spaced apart in use. They can be flexible metal, or heavily metallized strips, or metal chains. They can also be jointed metal bars, in two, three or more sections. They can also be ganged together for use in groups. Preferably, the electrically conductive bands 22 are lightweight and flexible so that they be easily folded away or rolled up when not use.

Therefore, ideally, the electrically conducting bands 22 should be made from a flexible and woven metal or metallized material. This allows the electrically conductive bands 22 to be associated into or with roll-down rain blinds at the sides or rear of the golf cart 60.

The number of such electrically conducting bands 22 will vary with the exact design of support. Typically there will usually be from six to twenty of such electrically conducting bands 22 in the lightning protection device 10. From eight to sixteen electrically conducting bands 22 is preferable, and FIG. 2 shows sixteen electrically conducting bands 22 by way of example. The spacing of the electrically conducting bands 22 may also vary. Typically, a spacing of from 20 cm to 40 cm will be usable. The cross-sectional area of the electrically conducting bands 22 depends on their material of construction, their internal configuration, the number used, and their length; exact limits can be calculated by the skilled engineer without exercise of inventive skill.

The center post 36 can either be flush with the top surface of the canopy support frame 62 or be upstanding and extending upwards from the canopy support frame 62. The function of the center post 36 is to provide a focus in the event of a lightning strike, and then to distribute the charge among the respective electrically conducting bands 22 so that such charge is conveyed around the golf cart 60 and into the ground 68. Clearly, the center post 36 should fulfill its function of providing a focus for lightning, but should not actually increase the possibility of such a lightning strike. For that reason, the center post 36 should not usually extend unduly above the electrically conducting bands 22 although a short upward spike may be provided if desired.

As depicted in FIG. 1, the lower ends of the electrically conducting bands 22 touch the ground 68. Optionally, the lower ends of the electrically conducting bands 22 may end above but still near the ground 68 rather than touching it. The lower ends of the electrically conducting bands 22 may terminate above ground level 68 because the lightning's charge will jump a small gap even if distributed among ten or twelve electrically conducting bands 22. Alternatively, if the electrically conducting bands 22 are suitably flexible, or flexibly arranged, or at least terminate in such flexible arrangements, they can rest on the ground 68 and accommodate by their flexibility any irregularities in the surface of the ground 68.

While the Applicant does not intend to be bound by any theory as to the operation of such a structure, it is believed that in the space within the golf cart 60, that is, within the electrically conducting cage or envelope 20 defined by the electrically conducting bands 22, a person in the passenger area 65 of the golf cart 60 member is electrically protected from the charge passing so that the lightning will not arc to or pass through the body of the person within the electrically conducting cage 20 but would take the more readily conductive course to the ground 68 to earth.

FIG. 4 shows the umbrella embodiment of the lightning protection device 10. In the umbrella embodiment, the same optional and preferred features apply as in the description of the golf cart embodiment.

The umbrella 70 is of standard umbrella construction that is commonly found in use on golf courses and beaches. While it is not necessary for the invention to function properly, the shaft 76 may be inserted into the ground 68 to hold the umbrella 70 upright while in use as shown in FIG. 4.

The umbrella 70 has a plurality of ribs 72 spaced apart and radiating outwardly from the ferrule 78 at the top end of the shaft 76. The ribs 72 are electrically conductive. The ribs support the canopy 74 which protects that area underneath the umbrella 70 from the sun and precipitation. The ribs 72 also act as a support means for the electrically conductive bands 22. Like the center post 36 for the golf cart embodiment, the ferrule 78 may extend above the ribs 72. It is recommended that the ferrule 78 is electrically conductive as well so that the ferrule 78 serves the same function as the center post 36. For added safety, it is recommended that the shaft 76 be constructed from a material that is a poor electrical conductor.

Figure 5:
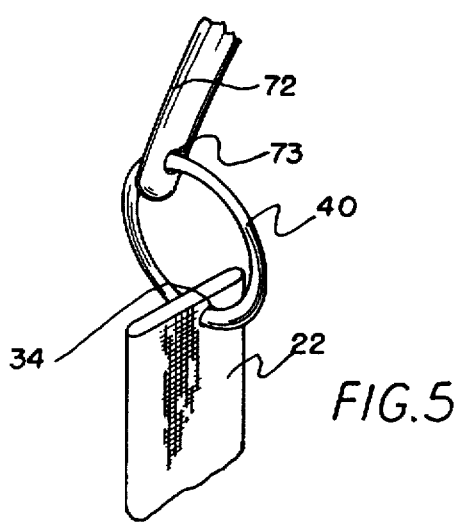
FIG. 5 is a break away perspective view of an electrical conducting band attached to a rib of the umbrella taken from the area enclosed by circle 5 of FIG. 4.

Downwardly depending from outer end of each of the ribs 72 is an electrically conducting band 22. Each of the electrically conducting bands 22 is attached to its corresponding rib 72 by an attachment ring 40 which is inserted through both the mounting ring hole 34 on the electrically conducting band 22 and the mounting ring hole 73 on the rib 72 as shown in FIG. 5. Together, the ribs 72 and the electrically conducting bands 22 form a electrically conducting cage 20 protecting individuals underneath the umbrella 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lightning protection device for a golf cart having a passenger area and a canopy support frame being extended over said passenger area, said lightning protection device comprising:

a golf cart having a passenger area and a canopy support frame being extended over said passenger area;

a center post being coupled to said canopy support frame; and a plurality of electrically conducting bands being spaced apart and being extended outwardly and downwardly from said center post, whereby said electrically conducting bands and said center post define an electrically conductive cage around said passenger area of said golf cart thereby protecting individuals within said passenger area from lightning strikes.

2. The lightning protection device of claim 1, wherein said electrically conducting bands extend downwardly to terminate in contact with the ground.

3. The lightning protection device of claim 1, wherein said electrically conducting bands are flexible.

4. The lightning protection device of claim 1, wherein said electrically conducting bands are metal chains.

5. The lightning protection device of claim 1, wherein said electrically conducting bands are jointed metal bars.

6. The lightning protection device of claim 1, further comprising a mounting bracket being supported by said center post, said electrically conducting bands being coupled to said mounting bracket.

7. The lightning protection device of claim 6, wherein said center post extends upwardly though said mounting bracket.

8. The lightning protection device of claim 6, wherein said mounting bracket has a plurality of band attachment slots, wherein each of said electrically conducting bands is inserted into one of said band attachment slots.

9. A lightning protection device for an umbrella having a shaft, said shaft having a ferrule, a plurality of ribs being spaced apart and being extended outwardly and downwardly from said ferrule, said lightning protection device comprising:

an umbrella having a shaft, and a plurality of spaced apart ribs, said shaft having a ferrule, said ribs being extended outwardly and downwardly from said ferrule; and a plurality of electrically conductive bands, each of said electrically conductive bands being downwardly depending from one of said ribs, said ribs, ferrule and electrically conductive bands defining an electrically conductive cage for protecting an individual underneath said umbrella from lightning strikes.

10. The lightning protection device of claim 9, wherein each of said electrically conductive bands is attached to one of said ribs by means of an attachment ring.

11. The lightning protection device of claim 9, wherein each of said electrically conductive bands has an attachment ring hole, wherein each of said ribs has an attachment ring hole, and wherein an attachment ring is inserted through each of said attachment ring holes of each of said electrically conductive bands is inserted through each of said attachment ring holes of each of said ribs.

12. The lightning protection device of claim 9, wherein said electrically conducting bands extend downwardly to terminate in contact with the ground.

13. The lightning protection device of claim 9, wherein said electrically conducting bands are flexible.

14. The lightning protection device of claim 9, wherein said electrically conducting bands are metal chains.

15. The lightning protection device of claim 9, wherein said electrically conducting bands are jointed metal bars.

* * * * *